US012574774B2

(12) United States Patent
    Bao et al.

(10) Patent No.:  US 12,574,774 B2
(45) Date of Patent:  Mar. 10, 2026

(54) TRANSMISSION PROCESSING METHOD AND TERMINAL

(71) Applicant: VIVO MOBILE COMMUNICATION CO., LTD., Guangdong (CN)

(72) Inventors: Wei Bao, Guangdong (CN); Xiaodong Yang, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 338 days.

(21) Appl. No.: 17/736,938

(22) Filed: May 4, 2022

(65) Prior Publication Data

US 2022/0263561 A1    Aug. 18, 2022

Related U.S. Application Data

(63) Continuation of application No. PCT/CN2020/126665, filed on Nov. 5, 2020.

(30) Foreign Application Priority Data

Nov. 6, 2019    (CN) .......................... 201911077174.7

(51) Int. Cl.
    *H04W 4/40*         (2018.01)
    *H04W 24/10*        (2009.01)
            (Continued)

(52) U.S. Cl.
    CPC ............. *H04W 24/10* (2013.01); *H04W 4/40* (2018.02); *H04W 72/40* (2023.01); *H04W 76/15* (2018.02);
            (Continued)

(58) Field of Classification Search
    CPC .... H04B 7/02–12; H04B 17/0082–409; H04L 1/0001–0039; H04L 5/0001–0098; H04W 4/06–80; H04W 8/18–245; H04W 24/02–10; H04W 28/02–26; H04W 56/0005–0025; H04W 72/02–569; H04W 76/10–50;
            (Continued)

(56) References Cited

U.S. PATENT DOCUMENTS

2017/0347394 A1    11/2017  Yasukawa et al.
2018/0049220 A1     2/2018  Patil et al.
            (Continued)

FOREIGN PATENT DOCUMENTS

CN          107079437 A      8/2017
CN          109478991 A      3/2019
            (Continued)

OTHER PUBLICATIONS

Second Office Action for Indian Application No. 202227025652, dated Feb. 20, 2024, 3 Pages.
            (Continued)

*Primary Examiner* — Timothy J Weidner
(74) *Attorney, Agent, or Firm* — BROOKS KUSHMAN P.C.

(57)            ABSTRACT

A transmission processing method and a terminal are provided. The method includes: transmitting a first message according to a priority of the first message, where the first message is CSI or the first message includes CSI and a non-CSI message, and the CSI is sidelink CSI.

18 Claims, 2 Drawing Sheets

(51) Int. Cl.

| | |
|---|---|
| *H04W 72/40* | (2023.01) |
| *H04W 76/15* | (2018.01) |
| *H04W 84/02* | (2009.01) |
| *H04W 88/02* | (2009.01) |
| *H04W 92/02* | (2009.01) |
| *H04W 92/10* | (2009.01) |
| *H04W 92/18* | (2009.01) |

(52) U.S. Cl.
CPC ............ *H04W 84/02* (2013.01); *H04W 88/02* (2013.01); *H04W 92/02* (2013.01); *H04W 92/10* (2013.01); *H04W 92/18* (2013.01)

(58) Field of Classification Search
CPC ... H04W 84/005–22; H04W 88/02–12; H04W 92/02–04; H04W 92/08–10; H04W 92/16–20
See application file for complete search history.

(56) References Cited

U.S. PATENT DOCUMENTS

| | | |
|---|---|---|
| 2019/0150147 A1 | 5/2019 | Lee et al. |
| 2020/0163155 A1 | 5/2020 | Lee et al. |
| 2021/0051681 A1* | 2/2021 | Manolakos ........... H04W 24/10 |
| 2022/0014325 A1 | 1/2022 | Zhao |
| 2022/0014338 A1* | 1/2022 | Yoshioka .............. H04W 24/10 |
| 2022/0286255 A1* | 9/2022 | Guo ...................... H04W 24/10 |

FOREIGN PATENT DOCUMENTS

| | | |
|---|---|---|
| CN | 109543012 A | 3/2019 |
| CN | 109644458 A | 4/2019 |
| CN | 111737991 A | 10/2020 |
| WO | 2018203669 A1 | 11/2018 |
| WO | 2019138088 A1 | 7/2019 |
| WO | 2020190068 A1 | 9/2020 |

OTHER PUBLICATIONS

First Office Action for Chinese Application No. 201911077174.7 dated Jan. 28, 2022, 7 Pages.

International Search Report and Written Opinion for Application No. PCT/CN2020/126665, dated Feb. 5, 2021, 8 Pages.

Ericsson, "On CSI Reporting," 3GPP TSG-RAN WG1 NR Ad Hoc #3, Agenda item 6.2.2.2, Sep. 18-21, 2017, R1-1716349, Nagoya, Japan, 12 Pages.

Intel Corporation, "Uu-Based Sidelink Resource Allocation for V2X Use Cases," 3GPP TSG RAN WG1 #96, Agenda item 7.2.4.3, Feb. 25-Mar. 1, 2019, R1-1902486, Athens, Greece, 10 Pages.

Lenovo et al., "Discussion on Physical Layer Procedures for NR Sidelink," 3GPP TSG RAN WG1 #98bis, Agenda Item 7.2.4.5, Oct. 14-20, 2019, R1-1910147, Chongqing, China, 9 Pages.

Interdigital Inc., "Remaining Aspects of CSI Reporting for NR V2X," 3GPP RAN WG2 #109e, Agenda item 6.4.3.1, Feb. 24-Mar. 6, 2020, R2-2000547, 4 Pages.

Extended European Search Report Application No. 20884637.8-1213, dated Dec. 13, 2022, 8 pages.

VIVO: "Physical layer procedure for NR sidelink", 3GPP Draft; RI-1910217 Physical Layer Procedure for NR Sidelink, Sophia-Antipolis Cedex, France, Dated Oct. 4, 2019, 24 pages.

First Office Action for Korean Patent Application No. 10-2022-7018216 dated Feb. 20, 2025. 11 pages.

Qualcomm Incorporated. Summary of UCI multiplexing on PUSCH. 3GPP TSG RAN WG1 Meeting #94bis. R1-1811878. Online. Oct. 2018. 17 pages.

Ericsson. Introduction of late drop capabilities. 3GPP TSG-RAN2 Meeting #105. R2-19xxxxx. Online. Feb.-Mar. 2018. 912 pages.

\* cited by examiner

300

301

Transmission module

400

Terminal 411  401

Radio frequency unit

Network module  402

403

Power supply

410

Audio output unit

409

Memory

Application program

Operating system

Processor

Input unit  404

Graphics processing unit  4041

Microphone  4042

408

Interface unit

Sensor  405

User input unit  4071

407

Touch panel

Other input devices

Display unit  406

Display panel

4072

4061

TRANSMISSION PROCESSING METHOD AND TERMINAL

CROSS-REFERENCE TO RELATED APPLICATIONS

This application is a continuation of International Application No. PCT/CN2020/126665 filed on Nov. 5, 2020, which claims priority to Chinese Patent Application No. 201911077174.7, filed on Nov. 6, 2019, which are incorporated herein by reference in their entireties.

TECHNICAL FIELD

This disclosure relates to the field of communications technologies, and in particular, to a transmission processing method and a terminal.

BACKGROUND

Some communications systems support sidelink (direct communication link, and the like) transmission, with which data transmission can be directly performed between terminals. Further, in some communications systems (for example, a 5G communications system), unicast, groupcast, and broadcast communications are supported on sidelink to allow more comprehensive service types. However, transmission of sidelink channel state information (CSI) is not supported at present, resulting in relatively poor performance of sidelink transmission.

SUMMARY

Embodiments of this disclosure provide a transmission processing method and a terminal.

According to a first aspect, an embodiment of this disclosure provides a transmission processing method, applied to a terminal and including:

transmitting a first message according to a priority of the first message, where the first message is CSI or the first message includes CSI and a non-CSI message, and the CSI is sidelink CSI.

According to a second aspect, an embodiment of this disclosure provides a terminal, including:

a transmission module, configured to transmit a first message according to a priority of the first message, where the first message is CSI or the first message includes CSI and a non-CSI message, and the CSI is sidelink CSI.

According to a third aspect, an embodiment of this disclosure provides a terminal, including a memory, a processor, and a program stored in the memory and capable of running on the processor, where when the program is executed by the processor, the steps of the transmission processing method according to the embodiments of this disclosure are implemented.

According to a fourth aspect, an embodiment of this disclosure provides a computer-readable storage medium, where the computer-readable storage medium stores a computer program, and when the computer program is executed by a processor, the steps of the transmission processing method according to the embodiments of this disclosure are implemented.

In the embodiments of this disclosure, a first message is transmitted according to a priority of the first message, where the first message is CSI or the first message includes CSI and a non-CSI message, and the CSI is sidelink CSI. In this way, transmission of the sidelink CSI can be supported to improve the performance of sidelink transmission.

DETAILED DESCRIPTION

The following clearly and describes the technical solutions in the embodiments of this disclosure with reference to the accompanying drawings in the embodiments of this disclosure. Apparently, the described embodiments are merely some rather than all of the embodiments of this disclosure. All other embodiments obtained by a person of ordinary skill in the art based on the embodiments of this disclosure without creative efforts shall fall within the protection scope of this disclosure.

In the specification and claims of this application, the term "include" and any other variants thereof are intended to cover a non-exclusive inclusion. For example, a process, method, system, product, or device that includes a list of steps or units is not necessarily limited to those expressly listed steps or units, but may include other steps or units not expressly listed or inherent to such process, method, product, or device. In addition, in the specification and claims, the use of "and/or" represents presence of at least one of the connected objects, for example, "A and/or B" indicates the following three cases: only A, only B, and both A and B.

In the embodiments of this disclosure, the terms such as "an example" or "for example" are used to represent an example, an illustration, or a description. Any embodiment or design solution described as "an example" or "for example" in the embodiments of this disclosure shall not be construed as being more preferable or advantageous than other embodiments or design solutions. Specifically, the terms such as "an example" or "for example" are intended to present related concepts in a specific manner.

The following describes the embodiments of this disclosure with reference to the accompanying drawings. A transmission processing method and a terminal provided in the embodiments of this disclosure may be applied to a wireless communications system. The wireless communications system may be a 5G system, an evolved long term evolution (eLTE) system, a long term evolution (LTE) system, a later evolved communications system, or the like.

Figure 1:
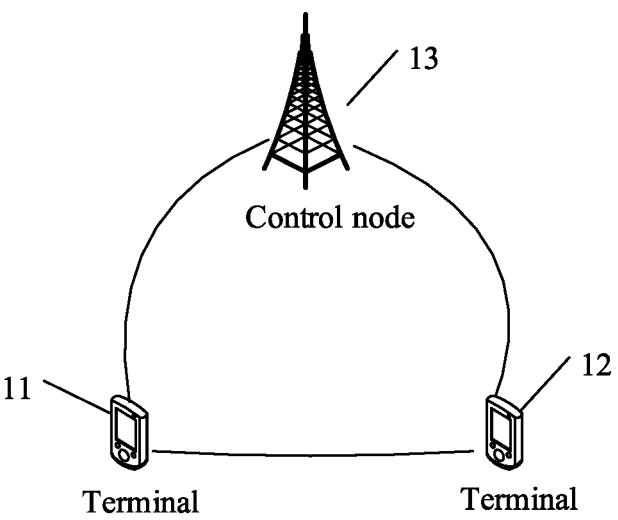
FIG. 1 is a structural diagram of a network system to which an embodiment of this disclosure may be applied.

FIG. 1 is a structural diagram of a network system to which an embodiment of this disclosure may be applied. As shown in FIG. 1, a terminal 11, a terminal 12, and a control node 13 are included, where communication between the terminal 11 and the terminal 12 may be performed through a PC5 interface by using sidelink, and communication between the control node 13 and a terminal (including the terminal 11 and the terminal 12) may be performed through an air interface (Uu) interface by using uplink and downlink. The terminal 11 and the terminal 12 may be user equipment (UE) or other terminal-side devices such as a mobile phone, a tablet personal computer, a laptop computer, a personal digital assistant (PDA), a mobile Internet device (MID), a wearable device, an intelligent vehicle, a vehicle-mounted device, or a robot. It should be noted that the terminal is not limited to any specific type in the embodiments of this disclosure. The control node 13 may be a network device, for example, a 4G base station, or a 5G base station, or a base station of a later release, or a base station in other communications systems, or may be referred to as a NodeB, or an evolved NodeB, or a transmission reception point (TRP), or an access point (AP), or other terms in the field. Provided that a same technical effect is achieved, the network device is not limited to any specific technical term. Alternatively, the control node 13 may be some integrated access backhaul (IAB) nodes, or may be some sidelink terminals, relays, or road side units (RSU), or certainly may be some other network facilities similar to the RSU or IAB. Further, some control nodes 13 may support sidelink or Uu link, or may support both sidelink and Uu link, which is not limited in the embodiments of this disclosure. It should be noted that a specific type of the control node 13 is not limited in the embodiments of this disclosure.

Figure 2:
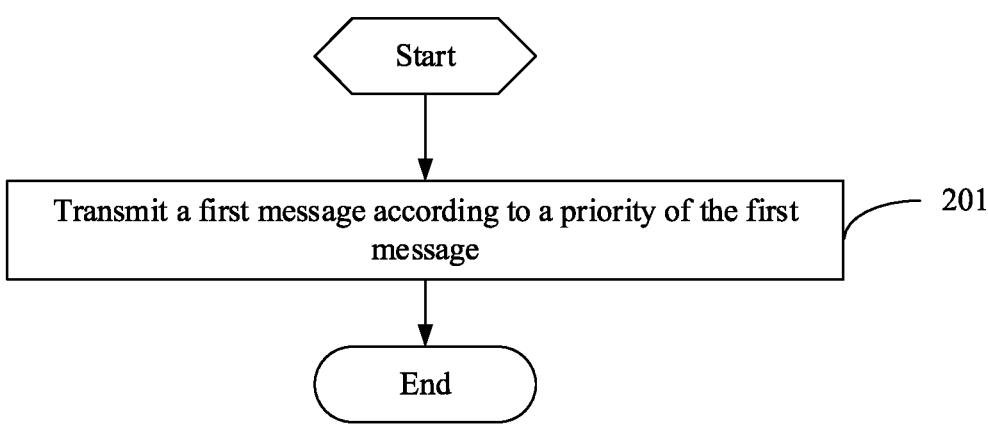
FIG. 2 is a flowchart of a transmission processing method according to an embodiment of this disclosure.

FIG. 2 is a flowchart of a transmission processing method according to an embodiment of this disclosure. The method is applied to a terminal. As shown in FIG. 2, the method includes the following steps.

Step 201: Transmit a first message according to a priority of the first message, where the first message is CSI or the first message includes CSI and a non-CSI message, and the CSI is sidelink CSI.

The first message may be one or more pieces of CSI or the first message may include one or more pieces of CSI and a non-CSI message. The non-CSI message may be one or more messages other than the CSI, for example, a data message (which may be referred to briefly as data), or control signaling (for example, CSI control signaling).

Specifically, the first message may include at least one of a sidelink message (that is, a message transmitted through a sidelink interface) and a Uu message (that is, a message transmitted through a Uu interface). The sidelink message may include at least one of the following:

media access control control element (MAC CE) for CSI report;

MAC CE for semi-persistent reporting CSI activation/ deactivation;

MAC CE for triggering aperiodic CSI report;

MAC CE for power headroom report (PHR) for power control;

MAC CE for carrier activation/deactivation; and

MAC CEs that may be introduced by other features.

The MAC CE for CSI report may be specific data for different types of report, such as periodic report, semi-persistent report, and aperiodic report, or distinguish between channel quality indicator (CQI) report, channel state information reference signal resource indicator (CSI-RS resource indicator, CRI) report, and the like in terms of report content.

Further, a service type transmittable by the sidelink message may include at least one of the following:

signaling radio bearer (SRB) for PC5 RRC transmission;

SRB for transmission of V2X layer signaling; and data radio bearer (DRB) for data transmission.

The SRB for PC5 RRC transmission may be a common control channel (CCCH) or a dedicated control channel (DCCH), and the SRB for transmission of V2X layer signaling may be a CCCH or a DCCH. The DRB may have different priorities, for example, a priority of an ultra reliable low latency communications (URLLC) service is higher, and a priority of an enhanced mobile broadband (eMBB) service is lower.

The Uu message may include at least one of the following:

MAC CE for a cell-radio network temporary identifier (C-RNTI) or data from an uplink common control channel (UL-CCCH) (MAC control element for C-RNTI or data from UL-CCCH);

MAC CE for data volume and power headroom report (DPR) (MAC control element for DPR);

MAC CE for semi-persistent scheduling (SPS) confirmation (MAC control element for SPS confirmation);

MAC CE for autonomous uplink (AUL) confirmation (MAC control element for AUL confirmation);

MAC CE for sidelink CSI report (MAC control element for sidelink CSI report);

MAC CE for buffer status report (BSR), with exception of BSR included for padding (MAC control element for BSR, with exception of BSR included for padding);

MAC CE for PHR, extended PHR, or dual connectivity PHR (MAC control element for PHR, Extended PHR, or Dual Connectivity PHR);

MAC CE for sidelink BSR, with exception of sidelink BSR included for padding (MAC control element for Sidelink BSR, with exception of Sidelink BSR included for padding);

data from any logical channel, except data from UL-CCCH (data from any Logical Channel, except data from UL-CCCH);

MAC CE for recommended bit rate query (MAC control element for Recommended bit rate query);

MAC CE for BSR included for padding (MAC control element for BSR included for padding); and MAC CE for sidelink BSR included for padding (MAC control element for Sidelink BSR included for padding).

It should be noted that, in some implementations, priorities of the above Uu messages may be defined in descending order according to the described order of these messages, without limitation though. The sidelink messages and Uu messages listed above are only examples for description, and the types and content of the messages are not limited in the embodiments of this disclosure.

In the embodiments of this disclosure, CSI always refers to sidelink CSI, and can be specifically used to report channel state related information of sidelink. For example, at least one of the following may be included:

CQI, precoding matrix indicator (PMI), CRI, SS/PBCH block resource indicator (SSBRI), layer indicator (LI), rank indicator (RI), layer 1 reference signal received power (L1-Reference Signal Received Power, L1-RSRP), and the like.

In addition, when there are a plurality of pieces of CSI, content included in different CSI may be different, for example, one piece of CSI includes CQI, and another piece of CSI includes PMI, or another piece of CSI may include at least one of CRI, SSBRI, LI, and L1-RSRP.

In this embodiment of this disclosure, the priority of the first message may be priorities of a plurality of messages included in the first message or priorities in content of a plurality of messages included in the first message. Optionally, the priority of the first message is predefined or determined according to a configuration rule. The predefinition herein may be predefinition in a protocol, configuration provided by a network side to a terminal, or pre-negotiation between terminals. The configuration rule may be a rule defined in the protocol, configured by the network side, or negotiated between terminals, for determining the priority of the first message. The priority of the first message may be determined according to the configuration rule to allow finer priority of the first message.

In this implementation, priorities of CSI and other data may be predefined or configured on the sidelink interface, or priorities of a plurality of pieces of CSI may be predefined or configured on the sidelink interface.

For example, there are three types of MAC CEs for CSI report respectively represented by CSI report MAC CE 1, CSI report MAC CE 2, and CSI report MAC CE 3, and two types of CSI control signaling, for example, MAC CE for CSI activation/deactivation and MAC CE for CSI trigger state selection. Their priorities may be defined in descending order according to the following description:

MAC CE for CSI report, including three types;

MAC CE for CSI control, including two types; and data, including SRB and DRB.

In this priority order, data may further be distinguished so that SRB and DRB have different priorities. For example, the descending order of priorities are defined as follows:

MAC CE for CSI report, including three types;

SRB data;

MAC CE for CSI control, including two types; and

DRB data.

In this priority order, CSI reports may further be distinguished so that different reports have different priorities. For example, the descending order of priorities are defined as follows:

CSI report MAC CE 1, for example, aperiodic report or report of a certain type may have a high priority;

MAC CE for CSI control, including two types; and

CSI report MAC CE 2 and CSI report MAC CE 3, for example, periodic report and semi-persistent report or report of other types may have a lower priority; and SRB data and DRB data.

In this priority order, CSI controls may further be distinguished so that different controls have different priorities. For example, the descending order of priorities are defined as follows:

CSI report MAC CE 1, for example, aperiodic report or report of a certain type may have a high priority;

MAC CE for CSI trigger state selection, for example, aperiodic report trigger may have a high priority;

CSI report MAC CE 2 and CSI report MAC CE 3, for example, periodic report and semi-persistent report or report of other types may have a lower priority;

MAC CE for CSI activation/deactivation, where signaling for activating semi-persistent scheduling may have a lower priority; and SRB data and DRB data.

It should be noted that the foregoing lists priority orders for CSI report, CSI control, and data transmission. In consideration of various other MAC CE types of sidelink, their priority relationships may be specified to define a unified order for the terminal to follow.

Similarly, priorities of CSI and other data may be predefined or configured on the Uu interface, or priorities of different CSI may be predefined or configured on the Uu interface.

In addition, the transmitting a first message according to a priority of the first message may be sequentially transmitting messages included in the first message according to the priority of the first message, or may be transmitting, according to the priority of the first message, a message or message content with a higher priority before a message or message content with a lower priority. The transmission may be transmission to one or more terminals through the sidelink interface, or may be transmission to the network side through the Uu interface.

In this embodiment of this disclosure, transmission of sidelink CSI can be supported through the foregoing step to report channel state related information of the sidelink, thereby improving the performance of sidelink transmission. For example, transmitting sidelink CSI on the sidelink interface enables a transmitting terminal to select a transmission parameter based on the sidelink CSI, so as to select a proper transmission parameter for transmission, thereby improving transmission efficiency and reducing resource waste. Transmission of sidelink CSI on the Uu interface allows a network-side device to perform better scheduling, thereby improving resource utilization.

In an optional implementation, in a case that the first message is one piece of CSI, the transmitting the first message according to a priority of the first message includes:

in a case that transmission resources are insufficient for transmitting the first message, performing transmission with the one piece of CSI reduced in size through truncation according to a priority of information content in the one piece of CSI.

That transmission resources are insufficient for transmitting the first message may be that transmission resources used for transmitting the CSI cannot accommodate all CSI report content. In this case, data with a higher priority is preferentially transmitted with its size reduced through truncation according to a priority of the CSI report content. For example, that the CSI is a CSI report MAC CE (CSI report MAC CE) is used as an example. Then, data with a higher priority is preferentially transmitted with its size reduced through truncation according to a priority inside the CSI report MAC CE.

The priority of the CSI report content may be predefined, for example, stipulated in a protocol standard. In a case of joint transmission, a priority of aperiodically triggered CSI is higher than a priority of periodic CSI or semi-persistent CSI. Certainly, the priority of the CSI report content may alternatively be determined according to the configuration rule, which is not limited.

It should be noted that, the, in a case that the transmission resources are insufficient for transmitting the first message, performing transmission with the one piece of CSI reduced in size through truncation according to a priority of information content in the one piece of CSI may be, in a case that the first message is determined to be able to transmitted according to priorities of a plurality of messages, and that the transmission resources for transmitting the first message are insufficient for transmitting the first message, performing transmission with the one piece of CSI reduced in size through truncation according to the priority of the information content in the one piece of CSI. The plurality of messages may be a plurality of messages including the first message. The priorities of the plurality of messages may be predefined or determined according to a configuration rule.

In the foregoing implementation, in a case that transmission resources are insufficient for transmitting all content of the CSI, the CSI can be transmitted with its size reduced through truncation, to ensure that the CSI can be transmitted. For example, on the sidelink interface, in a case that resources are insufficient to accommodate all sidelink CSI information content of the CSI, the sidelink CSI information content is reduced in size through truncation according to the foregoing priority, and a part with a higher priority is preferentially transmitted. Similarly, on the Uu interface, in a case that resources are insufficient to accommodate all sidelink CSI information content of the CSI, the sidelink CSI information content is reduced in size through truncation according to the foregoing priority, and a part with a higher priority is preferentially transmitted.

In an optional implementation, in a case that the first message is a plurality of messages, the plurality of messages may be sequentially transmitted according to priorities of the plurality of messages. For example, in a case that the first message is a plurality of pieces of CSI, the transmitting the first message according to a priority of the first message includes:

sequentially transmitting the plurality of pieces of CSI according to priorities of the plurality of pieces of CSI.

In this implementation, the plurality of messages can be sequentially transmitted. In this way, in a case that resources are insufficient, how a plurality of messages are selectively transmitted can be resolved according to the foregoing priorities, thereby improving transmission performance of the terminal. For example, on the sidelink interface, in a case that the resources are insufficient, the CSI and other data are sequentially transmitted according to the foregoing priorities, to resolve the selective transmission of the CSI and the other data; on the Uu interface, in a case that the resources are insufficient, the CSI and other data are sequentially transmitted according to the foregoing priorities, to resolve the selective transmission of the CSI and the other data.

Certainly, this embodiment of this disclosure is not limited to sequentially transmitting the plurality of messages, but a message with a higher priority in the plurality of messages may be transmitted with a message with a lower priority dropped.

In an optional implementation, the first message is messages of a plurality of links; and the transmitting a first message according to a priority of the first message includes:

sequentially transmitting the messages of the plurality of links according to priorities of the plurality of links.

The priorities of the plurality of links may be predefined or determined according to a configuration rule. The plurality of links may be links of broadcast, groupcast, and unicast.

For example, a priority of a first link is the highest priority of to-be-transmitted content on the first link or the highest priority of active services on the first link, and the first link is any one of the plurality of links.

That the first link is any one of the plurality of links may be understood as that a priority of each link in the plurality of links is the highest priority of to-be-transmitted content on the link or the highest priority of active services on the link.

To-be-transmitted content on a link may be content to be transmitted on the link, and active services on a link may be services active on the link, which include the content to be transmitted, a service that currently has no data, and the like.

In addition, priorities of to-be-transmitted content and active services on different links may be predefined, for example, as defined in the foregoing example. For example, CSI report MAC CE has the highest priority, with CSI control MAC CE (CSI control MAC CE) second and data third to it. In this case, when all links have data in transmission, the highest priorities of to-be-transmitted data on these links are compared. For example, the highest priority data on link 1 is CSI report MAC CE, the highest priority data on link 2 has a priority value of 2, and the highest priority data on link 3 has a priority value of 4 (where a smaller number means a higher priority). Therefore, a priority order of these links is link 1>link 2>link 3, and resources are occupied according to this order. Different links cannot transmit data simultaneously, that is, only after the transmission of high priority data of link 1 is completed will the transmission on link 2 be processed, followed by link 3.

Further, if there are at least two links with a same priority in the plurality of links, messages of the at least two links may be sequentially transmitted according to a preset message type based order.

The preset message type based order may be protocol-defined, configured by a network side, or pre-negotiated between terminals. For example, in a case that priorities of the links of broadcast, groupcast, and unicast are the same, priorities of groupcast, broadcast, and unicast may be in descending order.

In an optional implementation, in a case that the first message is sidelink messages of a plurality of message types, the transmitting a first message according to a priority of the first message includes:

sequentially transmitting the sidelink messages of the plurality of message types according to priorities of the plurality of message types.

The plurality of message types include at least two of unicast, groupcast, and broadcast. Certainly, the plurality of message types may be other message types. The priorities of the plurality of message types may be determined according to a configuration rule.

For example, in a case that the plurality of message types include at least two of unicast, groupcast, and broadcast, priorities of unicast, groupcast, and broadcast may be determined based on a first priority parameter.

The first priority parameter may be protocol-defined, configured by the network side, or the like.

For example, the first priority parameter may include a first priority threshold.

If a priority value of the highest priority of groupcast or broadcast is smaller than or equal to the first priority threshold, a priority of a message of groupcast or broadcast is higher than priorities of some or all messages of unicast; or if a priority value of the highest priority of groupcast or broadcast is greater than the first priority threshold, a priority of a message of groupcast or broadcast is lower than priorities of some or all messages of unicast; where a smaller priority value means a higher priority.

The highest priority of unicast, groupcast, or broadcast may be the highest priority of to-be-transmitted content or active services of unicast, groupcast, or broadcast.

Using the first priority parameter can implement determining priorities according to a configuration rule to allow finer control on priorities.

Because unicast may include CSI, control information, or report information, and these information may have different priorities, that a priority of a message of groupcast or broadcast is lower than priorities of some or all messages of unicast may be that the priority of the message of groupcast or broadcast is lower than the priorities of some or all messages of unicast; and that a priority of a message of groupcast or broadcast is higher than priorities of some or all messages of unicast may be that the priority of the message of groupcast or broadcast is higher than the priorities of some or all messages of unicast. Specifically, this may be set according to a scenario or service requirement.

Certainly, priorities of messages in unicast, groupcast, and broadcast may be preconfigured. For example, priority values of all types of unicast MAC CEs are configured. When a conflict occurs, which of unicast MAC CE, unicast data, and groupcast/broadcast data is transmitted earlier is determined by comparing their priorities.

In an optional implementation, in a case that the first message is a Uu message, the priority of the first message is determined based on message content; or the priority of the first message is determined based on a second priority parameter.

The determining based on message content may be determining based on content transmitted by the messages. For example, a descending order of priorities for data on the Uu interface is defined in the following list:

MAC CE for C-RNTI or data from UL-CCCH;

MAC CE for DPR;

MAC CE for SPS confirmation;

MAC CE for AUL confirmation;

MAC CE for sidelink CSI report;

MAC CE for BSR, with exception of BSR included for padding;

MAC CE for PHR, extended PHR, or dual connectivity PHR;

MAC CE for sidelink BSR, with exception of sidelink BSR included for padding;

data from any logical channel, except data from UL-CCCH;

MAC CE for recommended bit rate query;

MAC CE for BSR included for padding; and

MAC CE for sidelink BSR included for padding.

It should be noted that the foregoing priority order for MAC CEs for sidelink CSI report is merely an example without limitation. For example, reports of different types, such as periodic/semi-persistent report and aperiodic report, or CSI report and CRI report, may be inserted in different places in the list, so that they have different relative priorities.

That the priority of the first message is determined based on a second priority parameter may be that the priority of the first message is flexibly determined based on the second priority parameter, that is, the priority of the first message is determined according to the configuration rule to allow finer control on the priority of the first message.

The second priority parameter may be protocol-defined, configured by the network side, or the like.

For example, the second priority parameter may include a second priority threshold; and if a priority value of the highest priority of a sidelink service of the terminal is smaller than or equal to the second priority threshold, a priority of the CSI is the highest in the first message, or a priority of the CSI is higher than a priority of a second message; or if a priority value of the highest priority of a sidelink service of the terminal is greater than the second priority threshold, a priority of the CSI is lower than a priority of a third message; where a smaller priority value means a higher priority.

The second message and the third message may be MAC CEs or data, and specifically may be the MAC CEs or data in the Uu messages listed above. Message types of the second message and the third message may be the same or different, and may be specifically protocol-defined.

That a priority of the CSI is lower than a priority of a third message may be understood as that the CSI is not preferentially reported in the first message, or is transmitted after the third message.

For example, the network side may configure a priority threshold N for the sidelink. In a case that the highest priority of the sidelink service of the terminal is smaller than or equal to the threshold N (where a smaller priority number means a higher priority), the CSI report MAC CE on the Uu interface may be preferentially reported or transmitted before a fixed data type (for example, the second message); in a case that the highest priority of the sidelink service of the terminal is greater than the threshold N, the CSI report MAC CE on the Uu interface is not preferentially reported or transmitted after some fixed data types (for example, the third message).

In the foregoing implementation, the priority of the first message may be flexibly determined based on the second priority parameter to allow finer control on the priority of the first message, further improving the performance of sidelink transmission.

In an optional implementation, the first message includes a sidelink message and a Uu message, where the sidelink message and the Uu message are the CSI; or at least one of the sidelink message and the Uu message includes the CSI and the non-CSI message; or one of the sidelink message and the Uu message includes the CSI, and the other thereof includes the non-CSI message.

That the sidelink message and the Uu message are the CSI may be that the sidelink message is sidelink CSI, and the Uu message is also sidelink CSI.

That at least one of the sidelink message and the Uu message includes the CSI and the non-CSI message may be that the sidelink message includes the CSI and the non-CSI message, and messages included in the Uu message are not limited; or the Uu message includes the CSI and the non-CSI message, and messages included in the sidelink message are not limited; or the sidelink message includes the CSI and the non-CSI message, and the Uu message includes the CSI and the non-CSI message. It should be noted that the CSI herein always refers to sidelink CSI.

That one of the sidelink message and the Uu message includes the CSI, and the other thereof includes the non-CSI message may be that the sidelink message includes the CSI, and the Uu message includes the non-CSI message; or the Uu message includes the CSI, and the sidelink message includes the non-CSI message.

In this way, when the sidelink message and the Uu message conflict, the sidelink message and the Uu message can be transmitted according to priorities of the sidelink message and the Uu message, to avoid erroneous transmission caused by the conflict. For example, when the terminal has both a requirement of transmitting data on the Uu interface and a requirement of transmitting data on the sidelink, the terminal cannot transmit the data on the Uu interface and the sidelink at the same time, so it is necessary to compare the priorities between the two and decide to first transmit data with a higher priority.

Optionally, the priorities of the sidelink message and the Uu message are determined based on a third priority parameter; or priorities of messages in the sidelink message and the Uu message are preconfigured.

The third priority parameter may be protocol-defined, configured by the network side, or the like.

For example, the third priority parameter may include a third priority threshold and a fourth priority threshold; and if a priority value of the highest priority of a sidelink interface is smaller than or equal to the third priority threshold and a priority value of the highest priority of a Uu interface is greater than or equal to the fourth priority threshold, the priority of the sidelink message is higher than the priority of the Uu message; if the priority value of the highest priority of the sidelink interface is greater than the third priority threshold or the priority value of the highest priority of the Uu interface is smaller than the fourth priority threshold, the priority of the sidelink message is lower than the priority of the Uu message; where a smaller priority value means a higher priority;

the highest priority of the sidelink interface is the highest priority of to-be-transmitted content on the sidelink interface or the highest priority of active services on the sidelink interface; and the highest priority of the Uu interface is the highest priority of to-be-transmitted content on the Uu interface or the highest priority of active services on the Uu interface.

The priority of the sidelink interface and the priority of the Uu interface may be that the Uu interface and the sidelink interface are considered as a whole. In this case, data on which interface is preferentially transmitted mainly depends on priorities of services. For example, two thresholds can be configured separately: a Uu priority threshold M (that is, the fourth threshold) and a sidelink priority threshold N (that is, the third threshold). In a case that the highest priority of active sidelink services is smaller than or equal to the threshold N, and a priority of active Uu services is greater than or equal to the threshold M (where a smaller priority number means a higher priority), sidelink data is preferentially transmitted; in a case that the highest priority of the active sidelink services is greater than the threshold N, or the priority of the active Uu services is smaller than the threshold M, transmission on the Uu interface takes precedence.

Certainly, to further refine the priority of the first message, MAC CEs on the Uu interface may be configured or specified with a priority that can be compared with that of data on the Uu interface, and MAC CEs on the sidelink interface may also be configured or specified with a priority that can be compared with that of data on the sidelink interface, including CSI report MAC CE transmitted on the sidelink and sidelink CSI report MAC CE transmitted on Uu. The Uu interface and the sidelink interface are respectively configured with two thresholds: a Uu priority threshold M (that is, the fourth threshold) and a sidelink priority threshold N (that is, the third threshold). In a case that the highest priority of to-be-transmitted data on the sidelink is smaller than or equal to the threshold N, and the highest priority of to-be-transmitted data on the Uu interface is greater than or equal to the threshold M (where a smaller priority number means a higher priority), sidelink data is preferentially transmitted; in a case that the highest priority of the to-be-transmitted data on the sidelink is greater than the threshold N, or the highest priority of the to-be-transmitted data on the Uu interface is smaller than the threshold M, transmission on the Uu interface takes precedence.

Certainly, the priorities of the messages in the sidelink message and the Uu message may alternatively be configured priorities that can be compared with each other. For example, MAC CEs and data on the Uu interface and MAC CEs and data on the sidelink interface are respectively configured with priorities that can be compared with each other. Then, when the Uu interface and the sidelink interface conflict, data with a higher priority is preferentially transmitted based on comparison of the highest priority of data on the Uu interface and the highest priority of data on the sidelink interface.

In this embodiment of this disclosure, according to the implementations provided above, the sidelink can support CSI report, so that a transmit end can learn the latest channel state information of a terminal, and priority processing of CSI report on the sidelink interface or the Uu interface is resolved. In addition, truncation can also be performed to improve resource utilization while ensuring that data with a higher priority is preferentially processed, which can improve overall system efficiency and user experience.

Figures 3, 4:
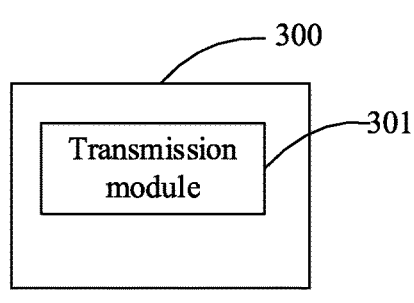
FIG. 3 is a structural diagram of a terminal according to an embodiment of this disclosure.
FIG. 4 is a structural diagram of another terminal according to an embodiment of this disclosure.

FIG. 3 is a structural diagram of a terminal according to an embodiment of this disclosure. As shown in FIG. 3, the terminal 300 includes:

a transmission module 301, configured to transmit a first message according to a priority of the first message, where the first message is CSI or the first message includes CSI and a non-CSI message, and the CSI is sidelink CSI.

Optionally, in a case that the first message is one piece of CSI, the transmission module 301 is configured to: in a case that transmission resources are insufficient for transmitting the first message, perform transmission with the one piece of CSI reduced in size through truncation according to a priority of information content in the one piece of CSI.

Optionally, in a case that the first message is a plurality of pieces of CSI, the transmission module 301 is configured to sequentially transmit the plurality of pieces of CSI according to priorities of the plurality of pieces of CSI.

Optionally, the priority of the first message is predefined or determined according to a configuration rule.

Optionally, the first message is messages of a plurality of links; and the transmission module 301 is configured to sequentially transmit the messages of the plurality of links according to priorities of the plurality of links.

Optionally, a priority of a first link is the highest priority of to-be-transmitted content on the first link or the highest priority of active services on the first link, and the first link is any one of the plurality of links.

Optionally, if there are at least two links with a same priority in the plurality of links, messages of the at least two links are sequentially transmitted according to a preset message type based order.

Optionally, in a case that the first message is sidelink messages of a plurality of message types, the transmission module 301 is configured to sequentially transmit the sidelink messages of the plurality of message types according to priorities of the plurality of message types.

Optionally, the plurality of message types include at least two of unicast, groupcast, and broadcast; and priorities of unicast, groupcast, and broadcast are determined based on a first priority parameter, or priorities of messages of unicast, groupcast, and broadcast are preconfigured.

Optionally, the first priority parameter includes a first priority threshold; and if a priority value of the highest priority of groupcast or broadcast is smaller than or equal to the first priority threshold, a priority of a message of groupcast or broadcast is higher than priorities of some or all messages of unicast; or if a priority value of the highest priority of groupcast or broadcast is greater than the first priority threshold, a priority of a message of groupcast or broadcast is lower than priorities of some or all messages of unicast; where a smaller priority value means a higher priority.

Optionally, in a case that the first message is a Uu message, the priority of the first message is determined based on message content; or

the priority of the first message is determined based on a second priority parameter.

Optionally, the second priority parameter includes a second priority threshold; and if a priority value of the highest priority of a sidelink service of the terminal is smaller than or equal to the second priority threshold, a priority of the CSI is the highest in the first message, or a priority of the CSI is higher than a priority of a second message; or if a priority value of the highest priority of a sidelink service of the terminal is greater than the second priority threshold, a priority of the CSI is lower than a priority of a third message; where a smaller priority value means a higher priority.

Optionally, the first message includes a sidelink message and a Uu message; and the sidelink message and the Uu message are the CSI; or at least one of the sidelink message and the Uu message includes the CSI and the non-CSI message; or one of the sidelink message and the Uu message includes the CSI, and the other thereof includes the non-CSI message.

Optionally, the priorities of the sidelink message and the Uu message are determined based on a third priority parameter; or priorities of messages in the sidelink message and the Uu message are preconfigured.

Optionally, the third priority parameter includes a third priority threshold and a fourth priority threshold; and if a priority value of the highest priority of a sidelink interface is smaller than or equal to the third priority threshold and a priority value of the highest priority of a Uu interface is greater than or equal to the fourth priority threshold, the priority of the sidelink message is higher than the priority of the Uu message; if the priority value of the highest priority of the sidelink interface is greater than the third priority threshold or the priority value of the highest priority of the Uu interface is smaller than the fourth priority threshold, the priority of the sidelink message is lower than the priority of the Uu message; where a smaller priority value means a higher priority;

the highest priority of the sidelink interface is the highest priority of to-be-transmitted content on the sidelink interface or the highest priority of active services on the sidelink interface; and the highest priority of the Uu interface is the highest priority of to-be-transmitted content on the Uu interface or the highest priority of active services on the Uu interface.

The terminal provided in this embodiment of this disclosure can implement the processes implemented by the terminal in the method embodiment in FIG. 2, with performance of sidelink transmission improved. To avoid repetition, details are not described herein again.

FIG. 4 is a schematic diagram of a hardware structure of a terminal for implementing the embodiments of this disclosure.

The terminal 400 includes but is not limited to components such as a radio frequency unit 401, a network module 402, an audio output unit 403, an input unit 404, a sensor 405, a display unit 406, a user input unit 407, an interface unit 408, a memory 409, a processor 410, and a power supply 411. A person skilled in the art can understand that the structure of the terminal shown in FIG. 4 does not constitute any limitation on the terminal. The terminal may include more or fewer components than those shown in the figure, or have some components combined, or have different arrangement of the components. In this embodiment of this disclosure, the terminal includes, but is not limited to, a mobile phone, a tablet computer, a notebook computer, a palmtop computer, a vehicle-mounted terminal, a robot, a wearable device, and a pedometer.

The radio frequency unit 401 is configured to transmit a first message according to a priority of the first message, where the first message is channel state information CSI or the first message includes CSI and a non-CSI message, and the CSI is sidelink CSI.

Optionally, in a case that the first message is one piece of CSI, the transmitting the first message according to a priority of the first message includes:

in a case that transmission resources are insufficient for transmitting the first message, performing transmission with the one piece of CSI reduced in size through truncation according to a priority of information content in the one piece of CSI.

Optionally, in a case that the first message is a plurality of pieces of CSI, the transmitting the first message according to a priority of the first message includes:

sequentially transmitting the plurality of pieces of CSI according to priorities of the plurality of pieces of CSI.

Optionally, the priority of the first message is predefined or determined according to a configuration rule.

Optionally, the first message is messages of a plurality of links; and the transmitting a first message according to a priority of the first message includes:

sequentially transmitting the messages of the plurality of links according to priorities of the plurality of links.

Optionally, a priority of a first link is the highest priority of to-be-transmitted content on the first link or the highest priority of active services on the first link, and the first link is any one of the plurality of links.

Optionally, if there are at least two links with a same priority in the plurality of links, messages of the at least two links are sequentially transmitted according to a preset message type based order.

Optionally, in a case that the first message is sidelink messages of a plurality of message types, the transmitting a first message according to a priority of the first message includes:

sequentially transmitting the sidelink messages of the plurality of message types according to priorities of the plurality of message types.

Optionally, the plurality of message types include at least two of unicast, groupcast, and broadcast; and priorities of unicast, groupcast, and broadcast are determined based on a first priority parameter, or priorities of messages of unicast, groupcast, and broadcast are preconfigured.

Optionally, the first priority parameter includes a first priority threshold; and if a priority value of the highest priority of groupcast or broadcast is smaller than or equal to the first priority threshold, a priority of a message of groupcast or broadcast is higher than priorities of some or all messages of unicast; or if a priority value of the highest priority of groupcast or broadcast is greater than the first priority threshold, a priority of a message of groupcast or broadcast is lower than priorities of some or all messages of unicast; where a smaller priority value means a higher priority.

Optionally, in a case that the first message is an air interface Uu message, the priority of the first message is determined based on message content; or the priority of the first message is determined based on a second priority parameter.

Optionally, the second priority parameter includes a second priority threshold; and if a priority value of the highest priority of a sidelink service of the terminal is smaller than or equal to the second priority threshold, a priority of the CSI is the highest in the first message, or a priority of the CSI is higher than a priority of a second message; or if a priority value of the highest priority of a sidelink service of the terminal is greater than the second priority threshold, a priority of the CSI is lower than a priority of a third message; where a smaller priority value means a higher priority.

Optionally, the first message includes a sidelink message and a Uu message; and the sidelink message and the Uu message are the CSI; or at least one of the sidelink message and the Uu message includes the CSI and the non-CSI message; or one of the sidelink message and the Uu message includes the CSI, and the other thereof includes the non-CSI message.

Optionally, the priorities of the sidelink message and the Uu message are determined based on a third priority parameter; or priorities of messages in the sidelink message and the Uu message are preconfigured.

Optionally, the third priority parameter includes a third priority threshold and a fourth priority threshold; and if a priority value of the highest priority of a sidelink interface is smaller than or equal to the third priority threshold and a priority value of the highest priority of a Uu interface is greater than or equal to the fourth priority threshold, the priority of the sidelink message is higher than the priority of the Uu message; if the priority value of the highest priority of the sidelink interface is greater than the third priority threshold or the priority value of the highest priority of the Uu interface is smaller than the fourth priority threshold, the priority of the sidelink message is lower than the priority of the Uu message; where a smaller priority value means a higher priority;

the highest priority of the sidelink interface is the highest priority of to-be-transmitted content on the sidelink interface or the highest priority of active services on the sidelink interface; and the highest priority of the Uu interface is the highest priority of to-be-transmitted content on the Uu interface or the highest priority of active services on the Uu interface.

The foregoing terminal can improve performance of sidelink transmission.

It should be understood that, in this embodiment of this disclosure, the radio frequency unit 401 may be configured to transmit or receive a signal in an information transmitting/receiving or call process. Specifically, the radio frequency unit 401 receives downlink data from a base station, transmits the downlink data to the processor 410 for processing, and transmits uplink data to the base station. Generally, the radio frequency unit 401 includes but is not limited to an antenna, at least one amplifier, a transceiver, a coupler, a low noise amplifier, a duplexer, and the like. In addition, the radio frequency unit 401 may further communicate with a network and other devices through a wireless communications system.

The terminal provides a user with wireless broadband Internet access by using the network module 402, for example, helping the user to transmit and receive e-mails, browse web pages, and access streaming media.

The audio output unit 403 may convert audio data received by the radio frequency unit 401 or the network module 402 or stored in the memory 409 into an audio signal and output the audio signal as a sound. In addition, the audio output unit 403 may further provide audio output (for example, a call signal received sound or a message received sound) related to a specific function performed by the terminal 400. The audio output unit 403 includes a speaker, a buzzer, a receiver, and the like.

The input unit 404 is configured to receive an audio or video signal. The input unit 404 may include a graphics processing unit (GPU) 4041 and a microphone 4042. The graphics processing unit 4041 processes image data of a static picture or a video obtained by an image capture apparatus (for example, a camera) in an image capture mode or a video capture mode. A processed image frame may be displayed on the display unit 406. The image frame processed by the graphics processing unit 4041 may be stored in the memory 409 (or another storage medium) or sent by using the radio frequency unit 401 or the network module 402. The microphone 4042 can receive a sound and process the sound into audio data. The processed audio data can be converted, in a telephone call mode, into a format that can be sent to a mobile communication base station through the radio frequency unit 401, for outputting.

The terminal 400 may further include at least one sensor 405, for example, an optical sensor, a motion sensor, and another sensor. Specifically, the optical sensor includes an ambient light sensor and a proximity sensor. The ambient light sensor may adjust luminance of a display panel 4061 based on brightness of ambient light, and the proximity sensor may turn off the display panel 4061 and/or backlight when the terminal 400 moves to an ear. As a type of motion sensor, an accelerometer sensor may detect magnitudes of accelerations in various directions (typically three axes), may detect a magnitude and direction of gravity when being stationary, and may be applied to terminal posture recognition (such as switching between a landscape orientation and a portrait orientation, related games, and magnetometer posture calibration), functions related to vibration recognition (such as pedometer and tapping), and the like. The sensor 405 may further include a fingerprint sensor, a pressure sensor, an iris sensor, a molecular sensor, a gyroscope, a barometer, a hygrometer, a thermometer, an infrared sensor, and the like. Details are not described herein again.

The display unit 406 is configured to display information input by the user or information provided to the user. The display unit 406 may include the display panel 4061. The display panel 4061 may be configured in a form of a liquid crystal display (LCD), an organic light-emitting diode (OLED), or the like.

The user input unit 407 may be configured to receive input digit or character information, and generate key signal input related to user setting and function control of the terminal. Specifically, the user input unit 407 includes a touch panel 4071 and other input devices 4072. The touch panel 4071 is also referred to as a touchscreen, and may collect a touch operation of the user on or near the touch panel (for example, an operation performed on or near the touch panel 4071 by the user by using any appropriate object or accessory such as a finger or a stylus). The touch panel 4071 may include two parts: a touch detection apparatus and a touch controller. The touch detection apparatus detects a touch orientation of the user, detects a signal brought by the touch operation, and transmits the signal to the touch controller. The touch controller receives touch information from the touch detection apparatus, converts the touch information into contact coordinates, transmits the contact coordinates to the processor 410, receives and executes a command sent by the processor 410. In addition, the touch panel 4071 may be implemented in a plurality of types, for example, as a resistive, capacitive, infrared, or a surface acoustic wave touch panel. In addition to the touch panel 4071, the user input unit 407 may further include the other input devices 4072. Specifically, the other input devices 4072 may include but are not limited to a physical keyboard, a function key (such as a volume control key or a power on/off key), a trackball, a mouse, and a joystick. Details are not described herein again.

Further, the touch panel 4071 may cover the display panel 4061. After detecting a touch operation on or near the touch panel 4071, the touch panel 4071 transmits the touch operation to the processor 410 for determining a type of the touch event. Then the processor 410 provides corresponding visual output on the display panel 4061 based on the type of the touch event. In FIG. 4, the touch panel 4071 and the display panel 4061 serve as two separate components to implement input and output functions of the terminal. However, in some embodiments, the touch panel 4071 and the display panel 4061 may be integrated to implement the input and output functions of the terminal. This is not specifically limited herein.

The interface unit 408 is an interface for connecting an external apparatus to the terminal 400. For example, the external apparatus may include a wired or wireless headphone port, an external power (or battery charger) port, a wired or wireless data port, a memory card port, a port for connecting an apparatus with an identification module, an audio input/output (I/O) port, a video I/O port, an earphone port, and the like. The interface unit 408 may be configured to receive input (for example, data information or power) from the external apparatus and transmit the received input to one or more elements inside the terminal 400, or may be configured to transmit data between the terminal 400 and the external apparatus.

The memory 409 may be configured to store software programs and various data. The memory 409 may mainly include a program storage region and a data storage region. The program storage region may store an operating system, an application program required by at least one function (for example, an audio play function or an image play function), and the like. The data storage region may store data (for example, audio data and a phone book) created based on use of the mobile phone, and the like. In addition, the memory 409 may include a high-speed random access memory, and may further include a non-volatile memory, for example, at least one magnetic disk storage device, flash memory device, or other volatile solid-state storage device.

The processor 410 is a control center of the terminal, which connects various parts of the entire terminal by using various interfaces and lines, and performs various functions of the terminal and processes data by running or executing software programs and/or modules stored in the memory 409 and invoking data stored in the memory 409, to perform overall monitoring on the terminal. The processor 410 may include one or more processing units. Optionally, the processor 410 may integrate an application processor and a modem processor. The application processor mainly processes an operating system, a user interface, an application program, and the like. The modem processor mainly processes wireless communication. It can be understood that the modem processor may alternatively not be integrated in the processor 410.

The terminal 400 may further include a power supply 411 (for example, a battery) that supplies power to the components. Optionally, the power supply 411 may be logically connected to the processor 410 through a power management system, to implement functions such as charging management, discharging management, and power consumption management through the power management system.

In addition, the terminal 400 includes some functional modules that are not shown, which are not further described herein.

Optionally, an embodiment of this disclosure further provides a terminal, including a processor 410, a memory 409, and a computer program stored in the memory 409 and capable of running on the processor 410. When the computer program is executed by the processor 410, the processes of the foregoing transmission processing method embodiments are implemented, with the same technical effects achieved. To avoid repetition, details are not described herein again.

An embodiment of this disclosure further provides a computer-readable storage medium, where the computer-readable storage medium stores a computer program. When the computer program is executed by a processor, the processes of the foregoing transmission processing method embodiments are implemented, with the same technical effects achieved. To avoid repetition, details are not described herein again. For example, the computer-readable storage medium is a read-only memory (ROM), a random access memory (RAM), a magnetic disk, or an optical disc.

It should be noted that in this specification, the terms "include", "comprise", or any of their variants are intended to cover a non-exclusive inclusion, so that a process, method, article, or apparatus that includes a list of elements not only includes those elements but also includes other elements that are not expressly listed, or further includes elements inherent to such process, method, article, or apparatus. Without more constraints, an element preceded by "includes a . . . " does not preclude the existence of other identical elements in the process, method, article, or apparatus that includes the element.

According to the foregoing description of the implementations, a person skilled in the art can clearly understand that the methods in the foregoing embodiments may be implemented by using software in combination with a necessary common hardware platform, and certainly may alternatively be implemented by using hardware. However, in most cases, the former is a more preferred implementation. Based on such an understanding, the technical solutions of this disclosure essentially or the part contributing to the prior art may be implemented in a form of a software product. The software product is stored in a storage medium (such as a ROM/RAM, a magnetic disk, or an optical disc), and includes several instructions for instructing a terminal (which may be a mobile phone, a computer, a server, an air conditioner, a network device, or the like) to perform the methods described in the embodiments of this disclosure.

The embodiments of this disclosure are described above with reference to the accompanying drawings, but this disclosure is not limited to these specific implementations. The foregoing implementations are merely illustrative rather than restrictive. Inspired by this disclosure, a person of ordinary skill in the art may develop many other manners without departing from the principle of this disclosure and the protection scope of the claims, and all such manners fall within the protection scope of this disclosure.

What is claimed is:

1. A transmission processing method, applied to a terminal and comprising:

transmitting messages of a plurality of links according to a priority of the plurality of links, wherein the plurality of links comprise a first link and a second link, or the plurality of links comprise at least the second link;

wherein the priority of the first link and the second link is determined according to the following rules:

the first link comprises at least one first channel state information (CSI), the priority of the first link is a priority of the at least one first CSI;

the second link comprises at least one first CSI and at least one non-CSI message, the priority of the second link is the highest priority among priorities of the at least one first CSI and the at least one non-CSI message.

2. The method according to claim 1, further comprises:

performing transmission with one piece of CSI reduced in size through truncation according to a priority of information content in the one piece of CSI in response to that transmission resources are insufficient for transmitting a first message.

3. The method according to claim 2, wherein a priority of the first message is predefined or determined according to a configuration rule.

4. The method according to claim 2, wherein in a case that the first message is sidelink messages of a plurality of message types, the transmitting a first message according to a priority of the first message comprises:

sequentially transmitting the sidelink messages of the plurality of message types according to priorities of the plurality of message types.

5. The method according to claim 4, wherein the plurality of message types comprise at least two of unicast, groupcast, and broadcast; and priorities of unicast, groupcast, and broadcast are determined based on a first priority parameter, or priorities of messages of unicast, groupcast, and broadcast are preconfigured.

6. The method according to claim 5, wherein the first priority parameter comprises a first priority threshold; and if a priority value of the highest priority of groupcast or broadcast is smaller than or equal to the first priority threshold, a priority of a message of groupcast or broadcast is higher than priorities of some or all messages of unicast; or if a priority value of the highest priority of groupcast or broadcast is greater than the first priority threshold, a priority of a message of groupcast or broadcast is lower than priorities of some or all messages of unicast; wherein a smaller priority value means a higher priority.

7. The method according to claim 2, wherein in a case that the first message is an air interface Uu message, the priority of the first message is determined based on message content; or the priority of the first message is determined based on a second priority parameter.

8. The method according to claim 7, wherein the second priority parameter comprises a second priority threshold; and if a priority value of the highest priority of a sidelink service of the terminal is smaller than or equal to the second priority threshold, a priority of the CSI is the highest in the first message, or a priority of the CSI is higher than a priority of a second message; or if a priority value of the highest priority of a sidelink service of the terminal is greater than the second priority threshold, a priority of the CSI is lower than a priority of a third message; wherein a smaller priority value means a higher priority.

9. The method according to claim 1, further comprises:

sequentially transmitting a plurality of pieces of CSI according to priorities of the plurality of pieces of CSI.

10. The method according to claim 1, wherein if there are at least two links with a same priority in the plurality of links, messages of the at least two links are sequentially transmitted according to a preset message type based order.

11. The method according to claim 1, wherein a first message comprises a sidelink message and a Uu message; and the sidelink message and the Uu message are the CSI;

at least one of the sidelink message and the Uu message comprises the CSI and the non-CSI message; or one of the sidelink message and the Uu message comprises the CSI, and the other thereof comprises the non-CSI message.

12. The method according to claim 11, wherein priorities of the sidelink message and the Uu message are determined based on a third priority parameter; or priorities of messages in the sidelink message and the Uu message are preconfigured.

13. The method according to claim 12, wherein the third priority parameter comprises a third priority threshold and a fourth priority threshold; and if a priority value of the highest priority of a sidelink interface is smaller than or equal to the third priority threshold and a priority value of the highest priority of a Uu interface is greater than or equal to the fourth priority threshold, the priority of the sidelink message is higher than the priority of the Uu message; if the priority value of the highest priority of the sidelink interface is greater than the third priority threshold or the priority value of the highest priority of the Uu interface is smaller than the fourth priority threshold, the priority of the sidelink message is lower than the priority of the Uu message; wherein a smaller priority value means a higher priority;

the highest priority of the sidelink interface is the highest priority of to-be-transmitted content on the sidelink interface or the highest priority of active services on the sidelink interface; and the highest priority of the Uu interface is the highest priority of to-be-transmitted content on the Uu interface or the highest priority of active services on the Uu interface.

14. A terminal, comprising a memory, a processor, and a program stored in the memory and capable of running on the processor, wherein when the program is executed by the processor, the steps of the transmission processing method are implemented, wherein the method comprises:

transmitting messages of a plurality of links according to a priority of the plurality of links, wherein the plurality of links comprise a first link and a second link, or the plurality of links comprise at least the second link;

wherein the priority of the first link and the second link is determined according to the following rules:

the first link comprises at least one first channel state information (CSI), the priority of the first link is a priority of the at least one first CSI;

the second link comprises at least one first CSI and at least one non-CSI message, the priority of the second link is the highest priority among priorities of the at least one first CSI and the at least one non-CSI message.

15. The terminal according to claim 14, wherein the program is further executed by the processor to:

perform transmission with one piece of CSI reduced in size through truncation according to a priority of information content in the one piece of CSI in response to that transmission resources are insufficient for transmitting a first message.

16. The terminal according to claim 15, wherein a priority of the first message is predefined or determined according to a configuration rule.

17. The terminal according to claim 14, wherein the program is further executed by the processor to:

sequentially transmit a plurality of pieces of CSI according to priorities of the plurality of pieces of CSI.

18. A non-transitory computer-readable storage medium, wherein the computer-readable storage medium stores a computer program, and when the computer program is executed by a processor, the steps of the transmission processing method are implemented, wherein the method comprises:

transmitting messages of a plurality of links according to a priority of the plurality of links, wherein the plurality of links comprise a first link and a second link, or the plurality of links comprise at least the second link;

wherein the priority of the first link and the second link is determined according to the following rules:

the first link comprises at least one first channel state information (CSI), the priority of the first link is a priority of the at least one first CSI;

the second link comprises at least one first CSI and at least one non-CSI message, the priority of the second link is the highest priority among priorities of the at least one first CSI and the at least one non-CSI message.

* * * * *